3,804,833
Patented Apr. 16, 1974

3,804,833
2-PHENYLIMINO-IMIDAZOLIDINES, THEIR 2-ANILINE - 2 - IMIDAZOLINE TAUTOMERS AND SALTS THEREOF
Helmut Stähle, Herbert Köppe, and Werner Kummer, Ingelheim am Rhein, and Wolfgang Hoefke, Budenheim, Germany, assignors to Boehringer Ingelheim GmbH, Ingelheim am Rhein, Germany
No Drawing. Filed Aug. 15, 1972, Ser. No. 280,774
Claims priority, application Germany, Aug. 20, 1971, P 21 41 818.8
Int. Cl. C07d 49/30, 49/36
U.S. Cl. 260—253        5 Claims

ABSTRACT OF THE DISCLOSURE

Compounds of the formula

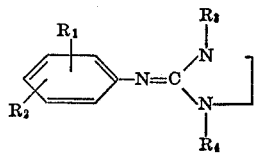

wherein $R_1$ and $R_2$, which may be identical to or different from each other, are each hydrogen, chlorine, bromine, trifluoromethyl, cyano, methoxy, methyl or ethyl, and
$R_3$ and $R_4$, which may be identical to or different from each other, are each hydrogen, alkyl of 1 to 3 carbon atoms, cycloalkyl of 5 to 7 carbon atoms or alkenyl of 3 to 5 carbon atoms, provided, however, that $R_3$ and $R_4$ are other than both hydrogen at the same time, their tautomers of the formula

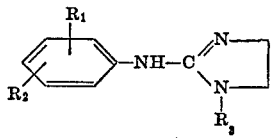

wherein $R_1$ and $R_2$ have the meanings defined above, and
$R_3$ has the meanings defined above except hydrogen, and non-toxic, pharmacologically acceptable acid addition salts thereof; the compounds as well as their salts are useful as hypotensives.

---

This invention relates to novel 2-phenylimino-imidazolidines, their 2-anilino-2-imidazoline tautomers, and acid addition salts thereof, as well as to a method of preparing these compounds.

More particularly, the present invention relates to a novel class of 2-phenylimino-imidazolidines represented by the formula

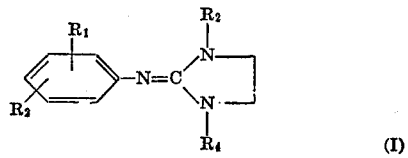

wherein $R_1$ and $R_2$, which may be identical to or different from each other, are each hydrogen, chlorine, bromine, trifluoromethyl, cyano, methoxy, methyl or ethyl, and
$R_3$ and $R_4$, which may be identical to or different from each other, are each hydrogen, alkyl of 1 to 3 carbon atoms, cycloalkyl of 5 to 7 carbon atoms or alkenyl of 3 to 5 carbon atoms, provided, however, that $R_3$ and $R_4$ are other than both hydrogen at the same time, and their non-toxic, pharmacologically acceptable acid addition salts.

When one of substituents $R_3$ and $R_4$ in Formula I is hydrogen, the 2-phenylimino-imidazolidine exists in equilibrium with the tautomeric 2-phenylamino-2-imidazoline form of the formula

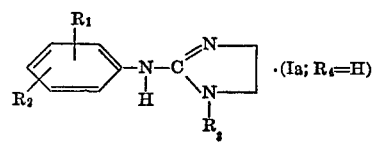

wherein $R_1$ and $R_2$ have the same meanings as in Formula I and $R_3$ has the same meanings as in Formula I except hydrogen.

The compounds of the present invention may be prepared by a number of different methods, among which the following is particularly convenient and efficient:

By reacting a phenyl-isocyanide of the formula

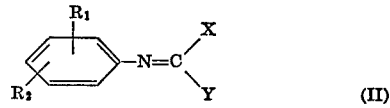

wherein $R_1$ and $R_2$ have the same meanings as in Formula I, and
X and Y, which may be identical to or different from each other, are each halogen, preferably chlorine, alkylthio of 1 to 3 carbon atoms, sulfhydryl or amino, with an ethylenediamine of the formula

wherein $R_3$ and $R_4$ have the same meanings as in Formula I, at a temperature between 0 and 180° C.

The reaction may be carried out in the presence of a polar protonic or polar aprotonic solvent medium or also without a solvent medium with the reactants in the molten state. The reaction time is relatively short and ordinarily ranges from about 10 to 60 minutes. The presence of an acid-binding agent, such as potassium carbonate, is of advantage when X and/or Y in Formula II are halogen. On the other hand, if the reactant of the Formula II is an isothiourea, for example, acid catalysis is of advantage; in those instances the reactant of the Formula II or the reactant of the Formula III is employed in the form of an acid addition salt thereof.

The compounds embraced by Formula I and their imidazoline tautomers are organic bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, sulfonic acid, phosphoric acid, nitric acid, acetic acid, propionic acid, butyric acid, caproic acid, valeric acid, oxalic acid, malonic acid, succinic acid, maleic acid, fumaric acid, lactic acid, tartaric acid, citric acid, malic acid, benzoic acid, p-hydroxy-benzoic acid, p-amino-benzoic acid, phthalic acid, cinnamic acid, salicylic acid, ascorbic acid, methanesulfonic acid, 8-chloro-theophylline or the like.

The following examples further illustrate the present invention and will enable others skilled in the art to understand it more completely. It should be understood, however, that the invention is not limited solely to the particular examples given as follows:

EXAMPLE 1

1-allyl-2-(2',6'-dichlorophenyl-amino)-2-imidazoline 8.5 gm. (0.034 mol) of 2,6-dichlorophenyl-isocyanide dichloride were admixed with 25 ml. of absolute benzene (mixture I). 7.0 gm. of N-allyl-ethylenediamine were admixed with 25 ml. of absolute benzene (mixture II). Mixture I and mixture II were simultaneously added dropwise to a mixture of 7.4 gm. of sodium carbonate and 50 ml. of absolute benzene at 10 to 12° C., accompanied by vigorous stirring. After the mixing was completed, the reaction mixture was stirred for 15 minutes more at 10 to 12° C., and then the precipitated inorganic salts were separated by vacuum filtration, and the filtrate was evaporated in vacuo. The residual oil was dissolved in 2 N hydrochloric acid, and the resulting acidic solution was extracted several times with ether; impurities passed into the ether phase, and the ether extracts were discarded. The aqueous acidic phase was made alkaline with dilute sodium hydroxide, and the precipitate formed thereby was taken up in three 100 ml. portions of ether. The combined ethereal extracts were dried over magnesium sulfate, and the ether was then evaporated in vacuo, leaving 4.2 gm. (44.4% of theory) of the compound of the formula

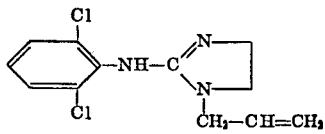

which had a melting point of 52° C.

Its nitrate had a melting point of 175–176° C. The compound was thin-layer chromatographically uniform.

EXAMPLE 2

1-allyl-2-[(2'-chloro-4'-methyl-phenyl)-amino]-2-imidazoline

A mixture consisting of 7.4 gm. (0.035 mol) of (2-chloro-4-methyl-phenyl)-isocyanide dichloride and 25 ml. of absolute benzene, and a mixture consisting of 7.0 gm. of N-allyl-ethylenediamine and 25 ml. of benzene were simultaneously added dropwise to a mixture of 7.4 gm. of sodium carbonate and 50 ml. of absolute benzene at 10 to 12° C., accompanied b vigorous stirring. After the mixing had been completed, the reaction mixture was stirred for about 10 minutes more at the same temperature, and then the precipitated inorganic salts were separated by vacuum filtration, and the filtrate was evaporated in vacuo. The residual oil was dissolved in 2 N hydrochloric acid, the resulting solution was extracted with three 100 ml. portions of ether, and the ethereal extracts were discarded. The acidic aqueous phase was made alkaline with dilute sodium hydroxide, the oily precipitate was extracted with two 100 ml. portions of ether, the combined ethereal extracts were dried over anhydrous calcium sulfate, and the ether was evaporated therefrom, leaving 5.8 gm. (66.7% of theory) of the compounds of the formula

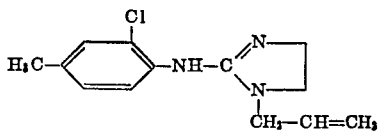

which did not crystallize. The product was thin-layer chromatographically pure (silicagel; system benzene:dioxane:conc. ammonio:ethanol=50:40:5:5; potassium iodoplatinate).

EXAMPLE 3

2-(2',6'-dichlorophenyl-amino)-1-methyl-2-imidazoline

A mixture consisting of 8.0 gm. of N-(2,6-dichlorophenyl)-S-methyl-isothiouronium hydroiodide and 4 ml. of N-methyl-ethylenediamine was heated for about 30 minutes on an oil bath at 180° C., accompanied by mechanical stirring. Thereafter, volatile components of the reaction mixture were evaporated in vacuo, and the viscous residue was dissolved at about 80° C. in dilute hydrochloric acid. The acidic solution was then made alkaline with 5 N sodium hydroxide, whereupon an oily substance separated out which crystallized throughout upon standing for a short period of time. The crystals were collected by vacuum filtration, yielding 4.0 gm. (74.6% of theory) of the compound of the formula

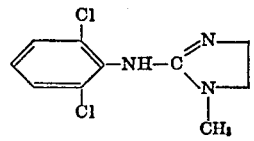

which had a melting point of 79–83° C.

Its nitrate had a melting point of 226° C.

EXAMPLE 4

1,3-dimethyl-2-(2',6'-dichlorophenyl-imino)-imidazolidine

A mixture consisting of 12.15 gm. (0.05 mol) of 2,6-dicholrophenyl-isocyanide dichloride and 50 ml. of absolute ether was added dropwise over a period of 20 minutes at 5 to 10° C. to a mixture consisting of 22.0 gm. of N,N'-dimethylethylenediamine and 75 ml. of absolute ether, accompanied by vigorous stirring. A white substance separated out of the initially clear reaction mixture after some time, and the mixture was allowed to stand for three hours at room temperature to permit the reaction to go to completion. Thereafter, dilute hydrochloric acid was added until a clear solution had formed which was then thoroughly stirred. The ethereal phase was separated and discarded, the aqueous phase was extracted with additional ether, and the ethereal extracts were also discarded. The acidic aqueous phase was now made alkaline with 5 N sodium hydroxide, whereupon an oily substance separated out which crystallized throughout after a short period of time. The crystals were collected by vacuum filtration, washed with an ample amount of water and petroleum ether, and dried in a vacuum drying chamber. 8.0 gm. (62.0% of theory) of the thin-layer chromatographically pure compound, M.P. 81–83° C., of the formula

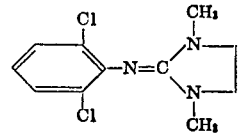

were obtained.

EXAMPLE 5

1,3-diethyl-2-(2',6'-dichlorophenyl-imino)-imidazolidine

A mixture consisting of 9.5 gm. (0.039 mol) of 2,6-dichlorophenyl-isocyanide dichloride and 50 ml. of absolute ether was added dropwise over a period of half an hour at 5° C. to a mixture consisting of 25.0 gm. of N,N'-diethyl-ethylenediamine and 75 ml. of absolute ether, accompanied by vigorous stirring, and the resulting reaction mixture was allowed to stand overnight at room temperature. Thereafter, the mixture was admixed with dilute hydrochloric acid until it reacted acid to Congo red, the ether phase was separated and discarded, the aqueous phase was extracted several times with additional ether, and the ethereal extracts were discarded. The acidic aqueous phase was treated with activated charcoal and was then made alkaline with 5 N sodium hydroxide, whereupon 8.6 gm. (77.0% of theory) of an oil separated out which did not crystallize even after standing for a prolonged period of time. The oily substance was the thin-layer chromatographically pure compound of the formula

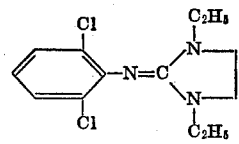

whose nitrate had a melting point of 133–134° C.

EXAMPLE 6

1-cyclopentyl-2-[(2',6'-dichloro-phenyl)-amino]-2-imidazoline

A mixture consisting of 7.3 gm. (0.03 mol) of 2,6-dichlorophenyl-isocyanide dichloride and 25 ml. of absolute benzene and a mixture consisting of 3.84 gm. (0.03 mol) of N-cyclopentyl-ethylenediamine and 25 ml. of absolute benzene were simultaneously added dropwise over a period of about 10 minutes to a mixture consisting of 6.4 gm. of sodium carbonate and 50 ml. of absolute benzene at 10 to 12° C. (cooling on ice bath), accompanied by through stirring. After the mixing had been completed the mixture was stirred for some time more and was then evaporated to dryness in vacuo. The residual oil was dissolved in dilute hydrochloric acid, the resulting solution was extracted several times with ether, and the ethereal extracts were discarded. The aqueous phase was now fractionally extracted with ether at gradually increasing pH values (buffering with diluted sodium hydroxide), and the ethereal extracts containing the desired product (determined by thin-layer chromatography in the system benzene:dioxane:ethanol-conc. ammonia=50:40:5:5; silicagel; potassium iodoplatinate) were combined, dried over anhydrous calcium sulfate, and the solvent was evaporated in vacuo, leaving 3.5 gm. (39.0% of theory) of the thin-layer chromatographically pure compound of the formula

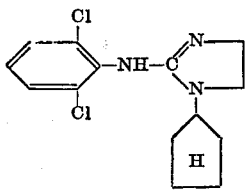

with $R_f$=0.8 in the above thin-layer chromatographic system.

EXAMPLE 7

1-cyclohepyl-2-[(2'-chloro-4'-methyl-phenyl)-amino]-2-imidazoline

A mixture consisting of 7.4 gm. (0.035 mol) of (2-chloro-4-methyl-phenyl)-isocyanide dichloride and 25 ml. of absolute benzene and a mixture consisting of 5.46 gm. (0.035 mol) of N-cycloheptyl-ethylenediamine and 25 ml. of absolute benzene were simultaneously added dropwise over a period of about 15 minutes to a mixture consisting of 7.6 gm. of sodium carbonate and 50 ml. of absolute benzene at 10–12° C. (cooling on ice bath), accompanied by vigorous stirring. The resulting mixture was stirred for 10 minutes more and was then vacuum-filtered to remove the precipitated inorganic salts. The filtrate was evaporated in vacuo, the residual viscous oil was dissolved in 2 N hydrochloric acid, the resulting solution was repeatedly extracted with ether at various pH values of less than 7, and the ethereal extracts were discarded. Thereafter, the aqueous phase was made alkaline with 2 N sodium hydroxide, whereupon an oily substance separated out which was extracted with ether. The ethereal extract was dried over anhydrous calcium sulfate and then evaporated in vacuo. Traces of moisture were removed from the residue by entrainment with benzene. The residue crystallized upon being triturated with a small amount of ether, and the crystals were collected by vacuum filtration, washed with a little cold ether and dried, yielding 1.7 gm. (16.1% of theory) of the compound of the formula

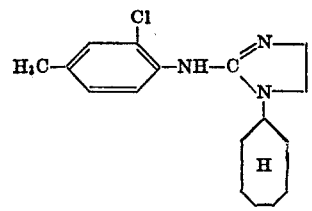

which had a melting point of 124–125° C.

EXAMPLE 8

1-cyclohexyl-2-[(2',6'-dichloro-phenyl)-amino]-2-imidazoline

A mixture consisting of 8.5 gm. (0.035 mol) of 2,6-dichlorophenyl-isocyanide dichloride and 50 ml. of absolute benzene and a mixture consisting of 4.95 gm. (0.035 mol) of N-cyclohexyl-ethylenediamine and 50 ml. of absolute benzene were simultaneously added dropwise over a period of about half an hour to a mixture consisting of 7.6 gm. of sodium carbonate and 50 ml. of absolute benzene at 10 to 12° C., accompanied by vigorous stirring. The resulting mixture was then stirred at room temperature for half an hour, subsequently evaporated in vacuo, and the residue was dissolved in 2 N hydrochloric acid. The resulting acidic solution was extracted several times with ether, buffered to a pH of 6–7 and again extracted with ether; all of the ethereal extracts were discarded. The aqueous phase was made alkaline with 2 N sodium hydroxide, the oily substance precipitated thereby was extracted with ether, the ethereal extract was dried over anhydrous calcium sulfate, and the ether was evaporated therefrom in vacuo. The oily residue crystallized upon being triturated with a very small amount of ether, and the white crystals were collected by vacuum filtration, yielding 5.8 gm. (53.2% of theory) of the compound of the formula

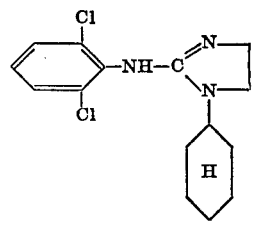

which had a melting point of 9–100° C.

EXAMPLE 9

Using a procedure analogous to that described in Example 7, 33% of theory of 1-cycloheptyl - 2 - [(2',6'-dichlorophenyl) - amino] - 2 - imidazoline, an oil, of the formula

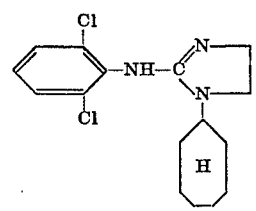

was obtained from (2,6-dichloro-phenyl)-isocyanide dichloride and N-cycloheptyl-ethylenediamine.

EXAMPLE 10

Using a procedure analogous to that described in Example 8, 29% of theory of 1-cyclohexyl-2-[(2'-chloro- 4′-methyl-phenyl)-amino]-2-imidazoline, M.P. 133–134° C., of the formula

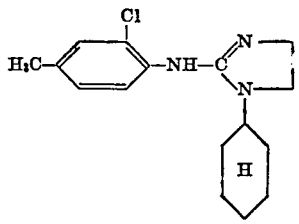

was obtained from (2-chloro-4-methyl-phenyl)-isocyanide dichloride and N-cyclohexyl-ethylenediamine.

EXAMPLE 11

Using a procedure analogous to that described in Example 6, 22% of theory of 1-cyclopentyl-2-[(2′-chloro-4′-methyl-phenyl)-amino]-2-imidazoline, M.P. 100–102° C., of the formula

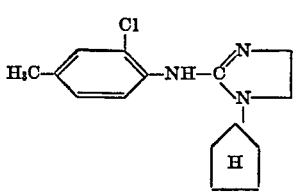

was obtained from (2-chloro-4-methyl-phenyl)-isocyanide dichloride and N-cyclopentyl-ethylenediamine.

EXAMPLE 12

Using a procedure analogous to that described in Example 6, 30% of theory of 1-cyclopentyl-2 - [(2′ - methyl-phenyl)-amino]-2-imidazoline, an oil, of the formula

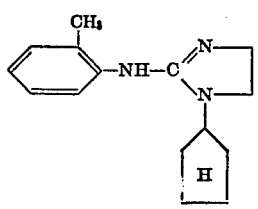

was obtained from (2-methyl-phenyl)-isocyanide dichloride and N-cyclopentyl-ethylenediamine.

Its picrate had a melting point of 152–153° C.

EXAMPLE 13

Using a procedure analogous to that described in Example 6, 50% of theory of 1-cyclopentyl-2 - [(2′,3′ - dichlorophenyl) - amino] - 2 - imidazoline, an oil, of the formula

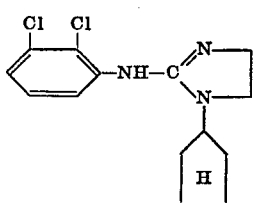

was obtained from (2,3 - dichloro - phenyl) - isocyanide dichloride and N-cyclopentyl-ethylenediamine.

EXAMPLE 14

Using a procedure analogous to that described in Example 6, 36% of theory of 1-cyclopentyl-2-[(2′,6′-dibromophenyl)-amino]-2-imidazoline, an oil, of the formula

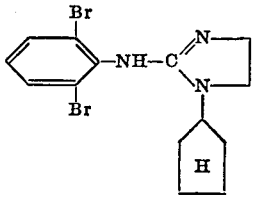

was obtained from (2,3-dibromo-phenyl) - isocyanide dichloride and N-cyclopentyl-ethylenediamine.

EXAMPLE 15

Using a procedure analogous to that described in Example 7, 38% of theory of 1-cycloheptyl-2-[2′,3′-dichlorophenyl)-amino] - 2 - imidazoline, an oil, of the formula

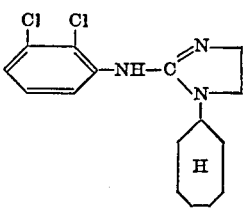

was obtained from (2,3-dichloro-phenyl)-isocyanide dichloride and N-cycloheptyl-ethylenediamine.

The compounds according to the present invention, that is those embraced by Formulas I and Ia and their nontoxic acid addition salts, have useful pharmacodynamic properties. More particularly, they exhibit a very effective hypotensive activity in warm-blooded animals, such as dogs and cats.

For pharmaceutical purposes the compounds according to the present invention are administered to warm-blooded animals perorally, enterally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0016 to 0.84 mgm./kg. body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 16

Tablets

The tablet composition is compounded from the following ingredients:

| | Parts |
|---|---|
| 1-cyclohexyl-2-[2′ - chloro - 4′ - methyl - phenyl)-amino] - 2 - imidazoline | 15 |
| Corn starch | 30 |
| Lactose | 30 |
| Magnesium stearate | 5 |
| Total | 80 |

Preparation

The ingredients are intimately admixed with each other, the mixture is granulated in conventional manner, and the dry granulate is compressed into 80 mgm. tablets in a conventional tablet making machine. Each tablet contains 15 mgm. of the imidazoline derivative and is an oral

EXAMPLE 17

Coated pills

The pill core composition is compounded from the following ingredients:

| | Parts |
|---|---|
| 1-cyclopentyl - 2 - [(2',6'-dichloro-phenyl)-amino]-2-imidazoline | 15 |
| Lactose | 33 |
| Corn starch | 30 |
| Colloidal silicic acid | 1 |
| Magnesium stearate | 1 |
| Total | 80 |

Preparation

The lactose, the corn starch and the colloidal silicic acid are intimately admixed with each other, the mixture is granulated in conventional manner with the aid of a soluble starch solution, the dried granulate is admixed with the imidazoline compound and the magnesium stearate, and the resulting composition is compressed into 80 mgm.-pill cores, which are subsequently coated with a thin shell consisting of a mixture of sugar, talcum and gum arabic and finally polished with beeswax. Each coated pill contains 15 mgm. of the imidazoline compound and is an oral dosage unit composition with effective hypotensive action.

EXAMPLE 18

Gelatin capsules

The capsule filler composition is compounded from the following ingredients:

| | Parts |
|---|---|
| 1-allyl - 2 - [(2',6' - dichloro - phenyl) - amino] - 2-imidazoline | 25 |
| Corn starch | 175 |
| Total | 200 |

Preparation

The ingredients are intimately admixed with each other, and 200 mgm. portions of the mixture are filled into gelatine capsules of suitable size. Each capsules contains 25 mgm. of the imidazoline compound and is an oral dosage unit composition with effective hypotensive action.

EXAMPLE 19

Hypodermic solution

The solution is compounded from the following ingredients:

| | Parts |
|---|---|
| 1 - cycloheptyl-2-[2' - chloro - 4' - methyl-phenyl)-amino]-2-imidazoline | 2.5 |
| Sodium chloride | 2.0 |
| Distilled water, q.s. ad 100.0 parts. | |

Preparation

The imidazoline compound and the ssodium chloride are dissolved in a sufficient amount of distilled water, and the solution is diluted to the indicated weight with additional distilled water and then filtered until free from suspended particles. The filtrate is filled into 1 cc. ampules under aseptic conditions, and the filled ampules are sterilized and then sealed. Each ampule contains 25 mgm. of the imidazoline compound and its contents are an injectable dosage unit composition with effective hypotensive action.

Analogous results are obtained when any one of the other compounds embraced by Formulas I and Ia, or a non-toxic acid addition salt thereof is substituted for the particular imidazoline derivative in Examples 16 through 19. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to those particular embodiments, and that various changes and modifications may be made without departing from the spirit of the invention or the scope of the appended claims.

We claim:

1. A compound of the formula

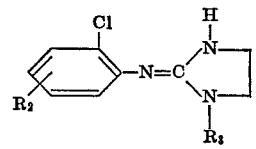

wherein
$R_2$ is 4-methyl or 6-chloro, and
$R_3$ is allyl or cycloalkyl of 5 to 7 carbon atoms, a tautomer of the formula

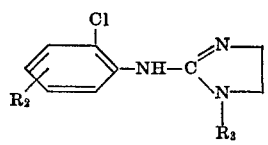

wherein $R_2$ and $R_3$ have the meanings previously defined, or a non-toxic, pharmacologically acceptable acid addition salt of said compound or said tautomer.

2. A compound of claim 1, which is 1-cyclohexyl-2-[(2'-chloro-4'-methyl-phenyl)-amino] - 2-imidazoline or a non-toxic, pharmacologically acceptable acid addition salt thereof.

3. A compound of claim 1, which is 1-cyclopentyl-2-[(2',6'-dichloro-phenyl)-amino] - 2-imidazoline or a non-toxic, pharmacologically acceptable acid addition salt thereof.

4. A compound of claim 1, which is 1-allyl-2-[(2',6'-dichloro-phenyl)-amino]-2-imidazoline or a non-toxic, pharmacologically acceptable acid addition salt thereof.

5. A compound of claim 1, which is 1-cycloheptyl-2-[(2'-chloro-4'-methyl-phenyl)-amino]-2-imidazoline or a non-toxic, pharmacologically acceptable acid addition salt thereof.

References Cited

UNITED STATES PATENTS

| 3,636,219 | 1/1972 | Culik et al. | 260—309.6 |

FOREIGN PATENTS

| 1,506,407 | 11/1967 | France | 260—309.6 |
| 1,506,408 | 11/1967 | France | 260—309.6 |
| 1,542,161 | 9/1968 | France | 260—309.6 |
| 1,566,035 | 3/1969 | France | 260—309.6 |
| 1,577,127 | 6/1969 | France | 260—309.6 |
| 1,577,129 | 6/1969 | France | 260—309.6 |
| 1,034,938 | 7/1966 | Great Britain | 260—309.6 |
| 407,645 | 2/1966 | Switzerland | 260—309.6 |
| 632,578 | 11/1963 | Belgium | 260—309.7 |
| 869,181 | 5/1961 | Great Britain | 260—309.7 |

NATALIE TROUSOF, Primary Examiner

U.S. Cl. X.R.

260—309.6, 309.7, 563 C, 563 P, 564 R, 564 E, 565, 566 R, 566 D; 424—251, 273